United States Patent [19]

Ullman

[11] Patent Number: 4,962,447

[45] Date of Patent: Oct. 9, 1990

[54] RADIO FREQUENCY SIGNAL AND POWER DISTRIBUTION DUCT

[76] Inventor: Allan Ullman, Lattingtown Rd., Glen Cove, N.Y. 11542

[21] Appl. No.: 403,194

[22] Filed: Sep. 5, 1989

[51] Int. Cl.⁵ ............................................. H02B 7/00
[52] U.S. Cl. ...................................... 361/422; 333/27; 361/356; 361/394; 439/578; 439/424; 439/428
[58] Field of Search ................. 358/84, 86; 333/24 R, 333/25, 26, 27, 115, 127, 128, 136; 174/48, 49, 59; 455/2–6, 132; 340/693; 439/210, 211, 216, 63, 578, 581; 361/331, 332, 334, 356, 358, 359, 378, 392–394, 417, 419, 420, 422, 424, 428

[56] References Cited

U.S. PATENT DOCUMENTS

| | | | |
|---|---|---|---|
| 4,032,821 | 6/1977 | Keiser | 361/334 |
| 4,097,894 | 6/1978 | Tanner | 361/422 |
| 4,307,435 | 12/1981 | Ullman | 361/334 |
| 4,569,567 | 2/1986 | Zucchini | 439/578 |
| 4,578,702 | 3/1986 | Campbell, III | 174/59 |
| 4,810,830 | 3/1989 | Komine | 361/424 |

Primary Examiner—Gerald P. Tolin
Attorney, Agent, or Firm—Morrison Law Firm

[57] ABSTRACT

A radio frequency signal and power distribution duct system includes mating interconnections permitting daisy chaining of a plurality of individual units to provide as many power and radio frequency signal outlets as desired. Three types of units, types A, B, and C are contemplated. Type A units receive power and signal from external sources. Type B units receive power and signal from type A units, and permit daisy chaining additional type B or type C units. Type C units connect to type A or type B units but do not provide for further daisy chaining. External connection of radio frequency signals in type A and type B units is performed through internal one-eighth wavelength coaxial cables, whereby, when a type A and a type B unit are connected together, the total length of connecting coaxial cable is one-quarter wavelength. An external termination may be connected to a type A or type B unit at the end of a daisy chain. An internal termination is connected to the last coaxial Tee in a type C unit.

9 Claims, 6 Drawing Sheets

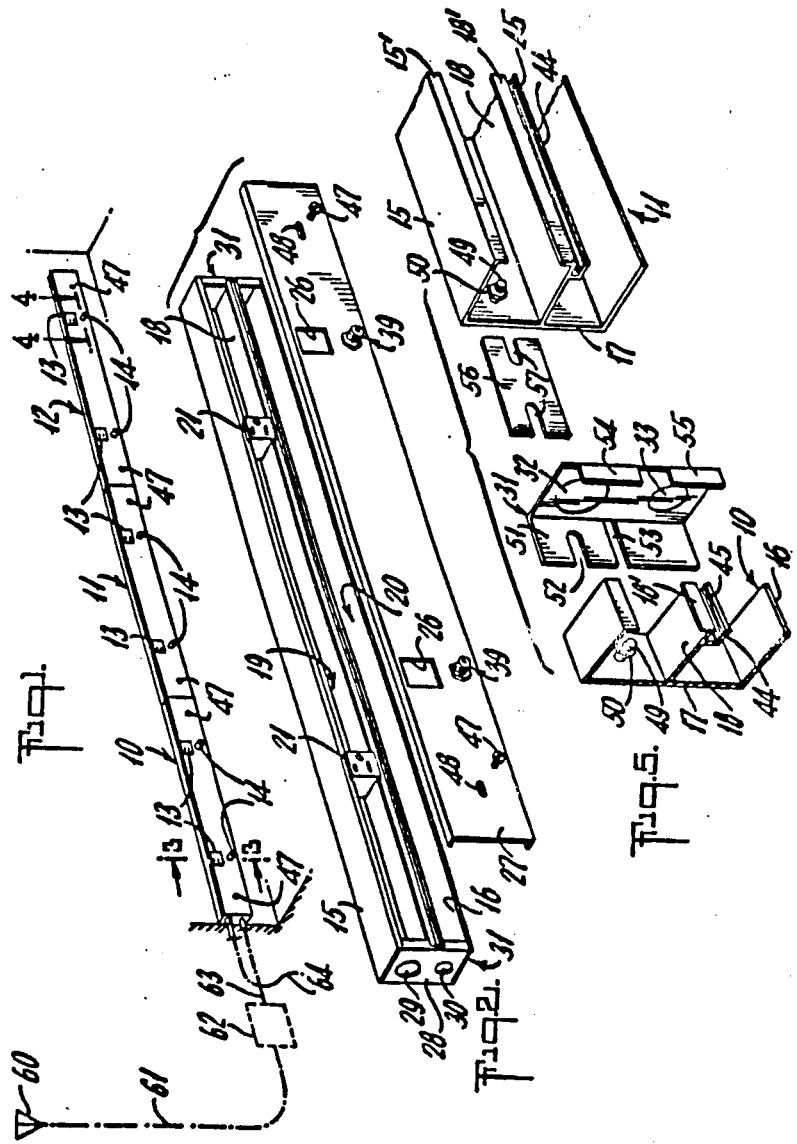

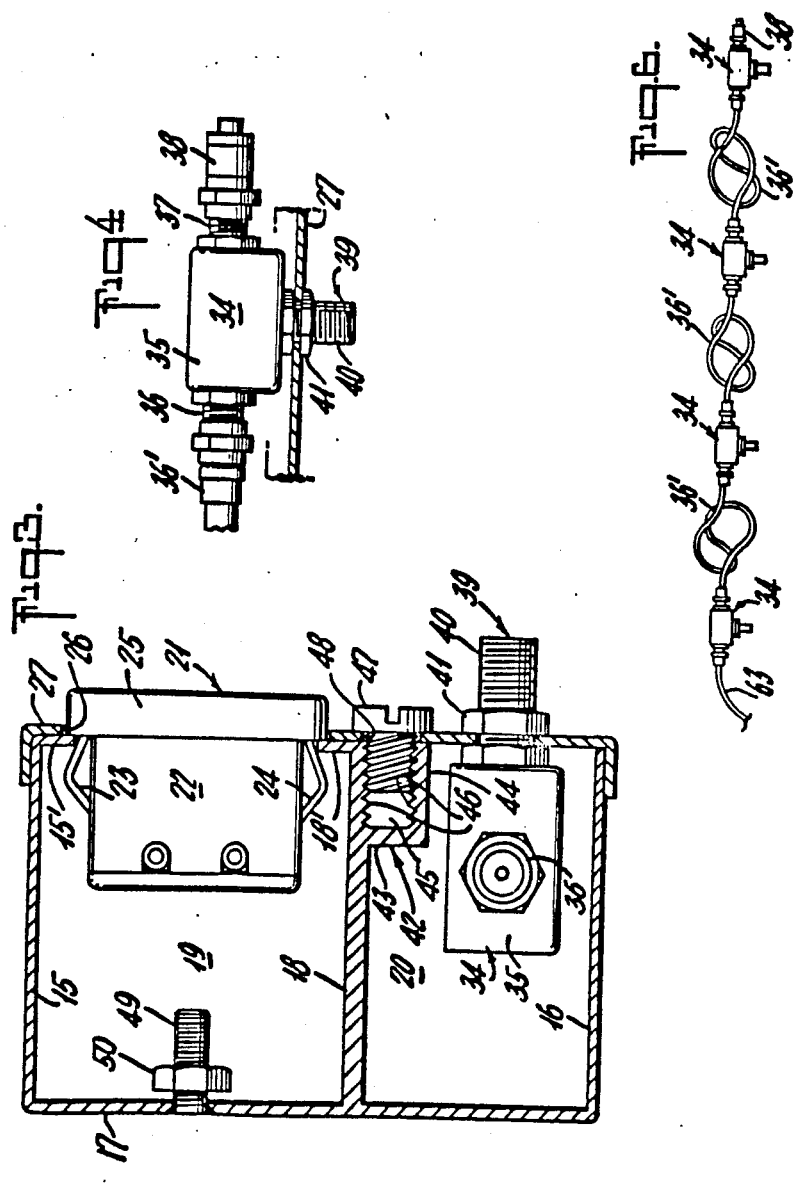

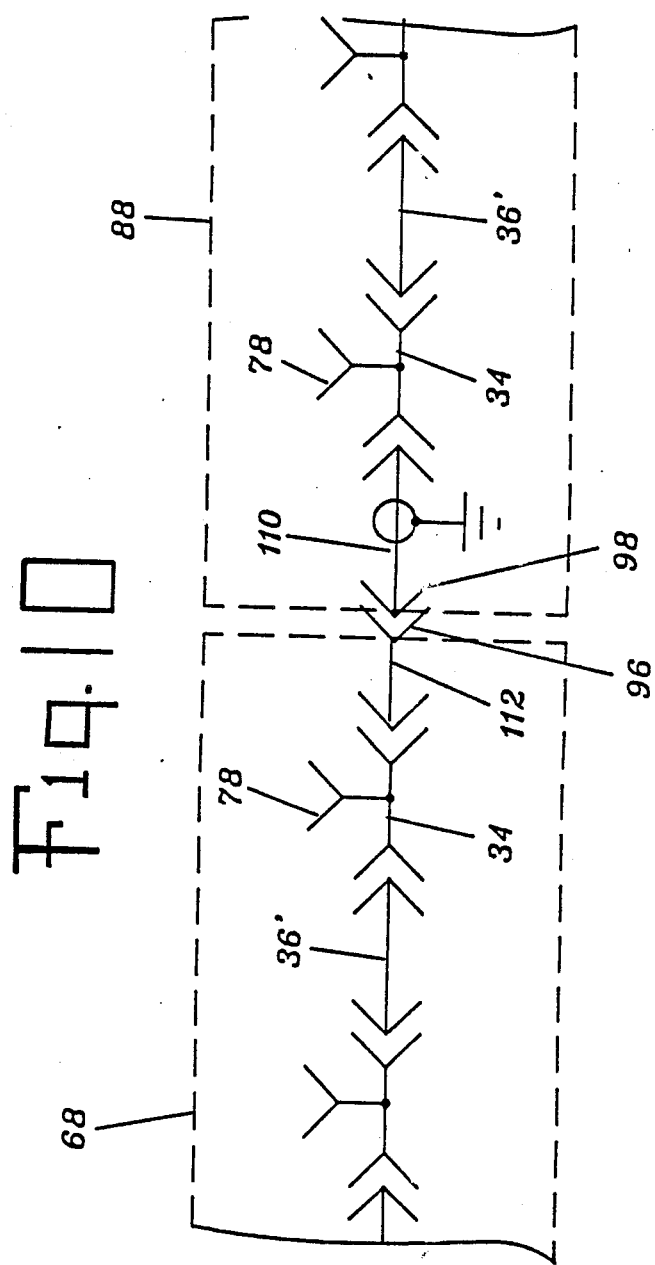

RADIO FREQUENCY SIGNAL AND POWER DISTRIBUTION DUCT

BACKGROUND OF THE INVENTION

The present invention to radio frequency and power supply distribution systems for operating a plurality of high frequency receivers such as television and radio receivers and more specifically to a signal and power distribution duct system particularly useful for supplying signals and power to a plurality of receivers for display in retail establishments.

In my prior U.S. Pat. No. 4,307,435, the disclosure of which is herein incorporated by reference, I disclose a power and signal duct wherein one or more channels, each having longitudinal compartments containing power receptacles isolated from signal receptacles. This patent also discloses techniques for connecting identical units end to end to create a duct of any length desired.

The duct of my prior patent is hard wired. In particular, the power connections thereto are individually connected thereto using conventional wiring techniques. When it is desired to connect two ducts end to end, the abutting ends of the two ducts are removed and a connecting plate is connected to splice the joint. Then, electrical interconnection must be made by connecting wires between the two sections. The signal connections are made with a length of coaxial cable between the two sections. Adjacent sections are further held together using a cover plate bridging adjacent ducts. This requires shorter sections of cover plate to fill in the portions not covered by the normal cover plate.

As will be evident to one skilled in the art, the necessity for modifying the ends of the duct sections, hard wiring multiple sections of duct, and installing cover plates by hand makes the system of my prior patent relatively inflexible in a retail setting characterized by frequent change of product and display location.

OBJECTS AND SUMMARY OF THE INVENTION

Accordingly, it is an object of the invention to provide a radio frequency signal and power distribution duct system which overcomes the drawbacks of the prior art.

It is a further object of the invention to provide a radio frequency signal and power distribution duct system having means for permitting plug-in connection between adjacent sections for both signal and power connection.

It is a still further object of the invention to provide a radio frequency signal and power distribution duct system having first, second and third family members. The first family member interfaces to power and signal sources. In addition, the first family member includes a power and signal connector mounted on an end thereof remote from the end receiving power and signal. The second family member includes power and signal connectors mateable, by push-type connection, with the connectors on the first family member. The second family member includes an internal signal termination and a blank second end. The third family member includes first power and signal connectors on a first end mateable with those on the end of the first family member, and second power and signal connectors on a second end mateable with those on the end of the second family member. The third family member permits adding as many duct units together as desired. An externally mountable termination is provided for terminating the signal line in the first and third family members.

Briefly stated, the present invention provides a radio frequency signal and power distribution duct system having mating interconnections to permit daisy chaining of a plurality of individual units to provide as many power and radio frequency signal outlets as desired. Three types of units, types A, B, and C are contemplated. Type A units receive power and signal from external sources. Type B units receive power and signal from type A units, and permit daisy chaining additional type B or type C units. Type C units connect to type A or type B units but do not provide for further daisy chaining. External connection of radio frequency signals in type A and type B units is performed through internal one-eighth wavelength coaxial cables, whereby, when a type A and a type B unit are connected together, the total length of connecting coaxial cable is one-quarter wavelength. An external termination may be connected to a type A or type B unit at the end of a daisy chain. An internal termination is connected to the last coaxial Tee in a type C unit.

According to an embodiment of the invention, there is provided a modular power and signal distribution system comprising: an A duct unit, the A duct unit including means for connecting electric power and a radio frequency signal to a first end thereof, at least one power receptacle in the A duct unit, the at least one power receptacle being accessible for supplying the electric power to at least one external device, at least one coaxial connector, the at least one coaxial connector being accessible for supplying the radio frequency signal to at least one external device, a female power connector rigidly affixed to a second end of the A duct unit, at least a second coaxial connector rigidly affixed to the second end in a predetermined positional relationship with the female power connector, a second duct unit, the second duct unit including a male power connector rigidly affixed to a third end thereof, the second duct unit further including a third coaxial connector rigidly affixed to the third end, the male power connector and the third coaxial connector being positioned in complementary positional relationship with the femal power connector and the at least a second coaxial connector, the complementary positional relationship being effective, when the third end is brought into mating alignment with the second end, to permit mating engagement between the male power connector and the female power connector and between the at least a second coaxial connector and the third coaxial connector, first internal means in the A duct unit for connecting the electric power to the at least one power receptacle and the female power connector, whereby connection thereto of electric power from the means for connecting electric power is enabled, second internal means in the A duct unit for connecting the radio frequency signal from the means for connecting a radio frequency signal to the at least one coaxial connector and the at least a second coaxial connector, whereby connection thereto of the radio frequency signal is enabled, and means for retaining the mating engagement.

According to a feature of the invention, there is provided a radio frequency distribution system comprising: a duct, means for connecting a radio frequency signal with a point on an exterior of the duct, at least first and second coaxial Tees in the duct, a first coaxial line interconnecting the at least first and second coaxial Tees, the first coaxial line having an electrical length of about one-half wavelength of an average wavelength of the electrical signal, a second coaxial line interconnecting the first coaxial Tee with the point on an exterior of the duct, and the second coaxial line having an electrical length of one-quarter wavelength of the average wavelength.

According to a further feature of the invention, there is provided a radio frequency signal distribution system comprising: first and second ducts, means for connecting a radio frequency signal to the first duct, at least a first coaxial Tee in the first duct, means for connecting the radio frequency to the first coaxial Tee, at least a first coaxial connector in the first duct, a first coaxial cable from the at least a first coaxial Tee to the at least a first coaxial connector, at least a second coaxial connector in the second duct, at least a second coaxial Tee in the second duct, a second coaxial cable from the second coaxial connector to the at least a second coaxial Tee, means for mating the at least a first coaxial connector and the at least a second coaxial connector, the first coaxial cable having an electrical length equal to an integral number of electrical wavelengths plus one-eighth of a wavelength at an average wavelength of the radio frequency signal, and the second coaxial cable having an electrical length equal to an integral number of electrical wavelengths plus one-eighth of a wavelength at an average wavelength of the radio frequency signal, whereby an electrical length from the at least a first coaxial Tee to the second coaxial Tee is equal to an integral number of the wavelengths plus one-quarter of the wavelength.

According to a still further feature of the invention, there is provided a radio frequency and power distrubution duct system comprising: an A duct unit, the A duct including means for connection to external sources of electric power and radio frequency signal, a B duct unit, the A duct unit and the B duct unit including means for mating therebetween, the means for mating including a female power connector in the A duct unit and a female power connector in the B duct unit, the male power connector being positioned for mating with the female power connector whereby electric power is connected from the A duct unit to the B duct unit, the means for mating including a first coaxial connector in the A duct unit, the first coaxial connector having a predetermined fixed positional relationship with the female power receptacle, the means for mating further including a second coaxial connector in the B duct unit, and the second coaxial connector having a complementary fixed positional relationship with the male power connector.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a perspective view of a power and signal distribution duct according to my referenced prior patent.

FIG. 2 is a partially exploded view of one section of the power and signal distribution duct of FIG. 1.

FIG. 3 is a cross section taken along 3—3 in FIG. 1.

FIG. 4 is a cross section taken along 4—4 in FIG. 1.

FIG. 5 is a partial closeup view of ends of adjacent sections of duct of FIG. 1, disconnected and showing elements for closing the end of a last section, and a connecting plate for splicing adjacent sections together.

FIG. 6 is a schematic diagram of the signal distribution portion of the apparatus of FIG. 1.

FIG. 10 is a schematic diagram of a type A or type B unit mated to a type B or type C unit.

DETAILED DESCRIPTION OF THE PREFERRED EMBODIMENT

Figure 7:
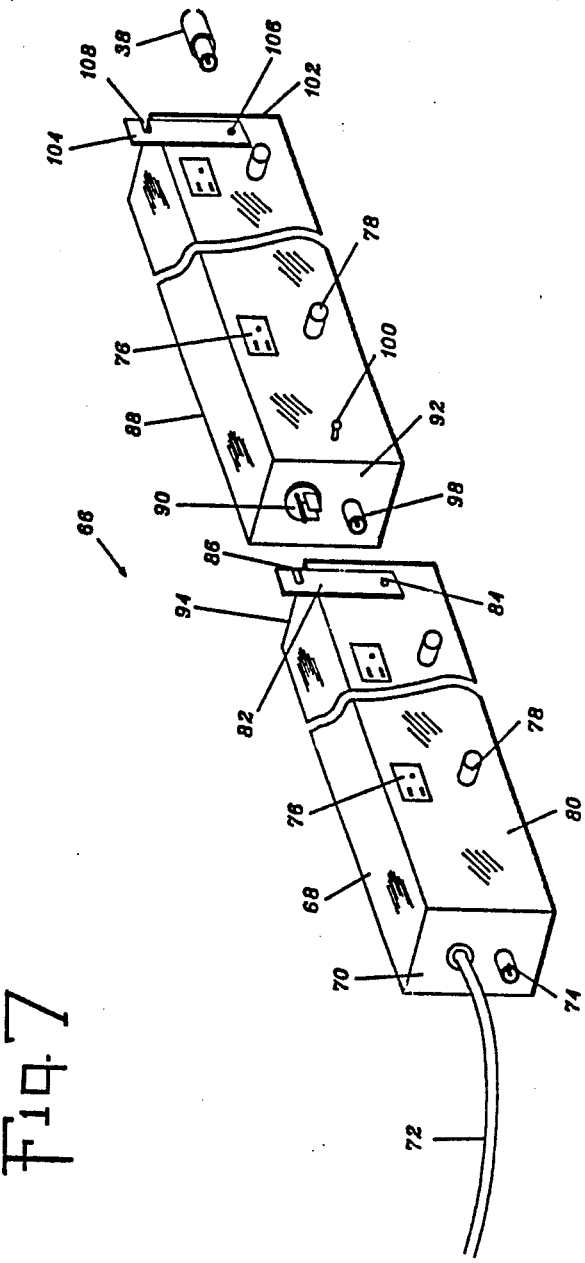
FIG. 7 is a perspective view of a type A unit and a type B unit.

Referring to FIG. 1, there is shown, a radio frequency and power distribution duct according to my prior referenced patent. First, second and third duct sections 10, 11 and 12 are interconnected end to end. Duct sections 10, 11 and 12 are identical. Thus, only duct section 10 is described in detail.

Referring to FIG. 2, duct section 10 includes one or more power outlets 13 and signal connectors 14 disposed between side walls 15 and 16. A bottom wall 17 joins side walls 15 and 16 to form a generally U-shaped structure. A longitudinal partition 18 depends from bottom wall 17 to divide the U-shaped structure into a power longitudinal compartment 19 and a signal longitudinal compartment 20. An inwardly extending flange 15, extends from side wall 15 toward longitudinal partition 18. Similarly, an inwardly extending flange 18' extends from longitudinal partition 18 toward side wall 15. Together, inwardly extending flanges 15' and 18' support at least one, and preferably two or more power receptacles 21 in a manner to be described below.

Referring now also to FIG. 3, each power receptacle 21 includes a body portion 22 having a width slightly less that a spacing between inwardly extending flanges 15' and 18'. Power receptacle 21 includes first and second outwardly extending spring member 23 and 24. An outer face 25 of power receptacle 21 has a width slightly greater than the width of power receptacle 21, whereby outer face 25 is enabled to overlie edges of inwardly extending flanges 15' and 18'. As power receptacle 21 is inserted into power longitudinal compartment 19, outwardly extending spring member 23 and 24 compress to permit outer face 25 to seat against inwardly extending flanges 15' and 18'. They then expand within power longitudinal compartment 19 to hold outer face 25 tightly engaged.

A cover 27 includes at least one receptacle opening 26 therein of a size permitting outer face 25 to fit therein. In the manner shown, power receptacles 21 can be placed anywhere along power longitudinal compartment 19. Thus, the positions of power receptacles 21 can be adjusted to fit the locations of receptacle openings 26.

Power receptacles 21 are wired in parallel in a conventional manner prior to installation in power longitudinal compartment 19. Electrical conductors for accomplishing such wiring are conventional and are thus not shown.

An end wall 28 of duct section 10 includes first and second knock-out openings 29 and 30 for installation of suitable connectors, and the like. In some installations knock-out opening 29 accommodates a conventional electrical power connector for affixing a power cable thereto. Knock-out opening 30 accommodates a radio frequency cable for feeding signals to the radio frequency outlets to be described.

Referring now to FIG. 4, the radio frequency distribution system includes one or more coaxial Tees 34 of a type having a metal housing 35 and first and second coaxial connectors 36 and 37 thereon. Coaxial connector 36 is shown connected to a coaxial cable 36, Coaxial connector 37 is shown connected to a termination 38.

Referring now to FIG. 6, termination 38 is installed on the last coaxial connector 37 in the system to prevent interfering reflections from being returned along the coaxial cable. Preceding coaxial Tees 34 are interconnected by coaxial cables 36′. The first coaxial Tee 34 receives radio frequency signals from a 75-ohm cable 63. The electrical length of each coaxial cable 36′ is about one-quarter wavelength of the average radio frequency to be distributed. As is well known, a quarter-wave coaxial line Returning now to FIGS. 3 and 4, each coaxial Tee 34 includes a third connector 39 having a threaded shank 40 that is positioned to extend through a hole in cover 27 and secured therein by a nut 41. A coaxial cable, not shown, may be affixed to the projecting portion of third connector 39 to connect radio frequency signals to a device such as, for example, a television set or radio.

As should be clear from the foregoing, the entire signal distribution system is affixed to cover 27. Thus, when cover 27 is positioned on duct section 10, the signal distribution system is positioned wholly within signal longitudinal compartment 20, and thereby is shielded from radiation originating in power longitudinal compartment 19.

Referring specifically to FIG. 3, longitudinal partition 18 includes a longitudinal channel 42 having a bottom wall 43 and a side wall 44. Walls 43 and 44, together with a portion of longitudinal partition 18 form an elongated channel 45. A width of elongated channel 45 is appropriate to engage a suitable machine screw 47. Optional serrations 46 may be formed in bottom wall 43 and side wall 44 with a pitch matching that of the threads of machine screw 47. Cover 27 includes a plurality of openings 48 therein to accommodate machine screws 47. It will be clear that the longitudinal positioning of cover 27 is not critical since machine screws 47 may be driven into elongated channel 45 anywhere along its length.

Referring now to FIG. 5, a second end wall 31 is similar to end wall 28, including knock-out openings 32 and 33. This provides the flexibility of attaching power and signal connectors at either end of duct section 10. Also shown in the figure is an adjacent end portion of duct section 11. Power longitudinal compartment 19 in duct section 10 and duct section 11 includes a threaded stud 49 at each end thereof. A cooperating nut 50 may be tightened on its threaded stud 49. End wall 31 includes an inwardly extending flange 51 having first and second slots 52 and 53 therein. Slot 53 fits about longitudinal partition 18. Slot 52 engages threaded stud 49. Nut 50 may be tightened on threaded stud 49 to retain end wall 31 in the installed position. An upper edge of end wall 31 includes first and second inwardly extending flanges 54 and 55. Inwardly extending flange 54 extends a short distance into power longitudinal compartment 19 and inwardly extending flange 55 extends a similar distance into signal longitudinal compartment 20. Inwardly extending flanges 54 and 55, together, provide support for the end edges of cover 27.

Instead of closing the end of duct section 10 with end wall 31, adjacent ends of duct sections 10 and 11 may be spliced together using a connecting plate 56. Connecting plate 56 includes first and second slots 57 and 58 which can be fitted onto threaded studs 49 in duct sections 10 and 11, and secured by tightening respective nuts 50. Although not illustrated, each duct section may include a plurality of holes in bottom wall 17 for attachment to a wall.

Returning now to FIG. 1, a radio-frequency signal from an antenna 60 is fed on a lead-in 61 to a matching transformer 62. Lead-in 61 conventionally has an impedance of about 300 ohms and 75-ohm cable 63, as well as coaxial cable elements 36′, have impedances of about 75 ohms. Matching transformer 62 performs the impedance transformation require for matching these elements together. A conventional power cable 64 provides power to power receptacles 21 within duct section 10.

As noted in the discussion of the background of the invention, a hard-wired system, such as discussed above, and disclosed in my referenced patent, is not convenient for a dynamic display area where store layout and merchandise display may require changing on short notice.

Referring now to FIG. 7, there is shown, generally at 66 a radio frequency and power distribution system according to an embodiment of the invention. In one embodiment, radio frequency and power distribution system 66 may consist of three types of units, hereinafter denominated as types A, B and C. A unit of type A is one to which external power and an antenna, or other source of radio frequency signal, is attached. A type A unit is shown at type A unit, wherein an entry end plate 70 includes entry for a conventional flexible power cord 72 for connection to an external source of electrical power (not shown). A coaxial connector 74 is affixed in entry end plate 70 for connection to a conventional coaxial connector (not shown) from a source of radio frequency signals. As in the prior-art embodiment above, a plurality of electric power receptacles 76 and coaxial Tees 78 are disposed on a cover 80. A latch plate 82 is pivoted to type A unit 68 on a pivot pin 84. A locking notch 86 is disposed in an edge of latch plate 82. Except as otherwise described hereinbelow, the interior arrangement of type A unit 68 can be assumed to be the same as that in my reference prior patent.

A type B unit 88 is one which is adapted to connect to, and receive electric power and radio frequency signals from a second end of type A unit 68 thereby to make available additional electric power receptacles 76 and coaxial Tees 78. A male power connector 90 is disposed in a mating end 92 of type B unit 88 facing a mating end 94 of type A unit 68. In addition, a push-type female power receptacle 96 is also disposed in type B unit 88 facing mating end 94 of type A unit 68.

Figure 8:
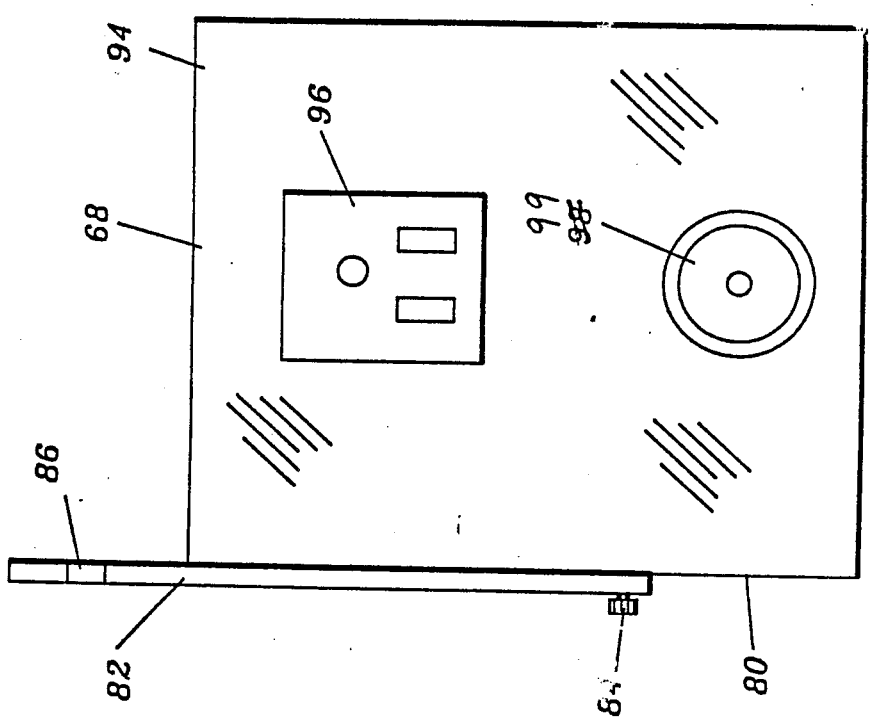
FIG. 8 is an end view of the type A, or type B unit of FIG. 7.

Referring momentarily to FIG. 8 in addition to FIG. 7, mating end 94 includes a female power receptacle 96 positioned for direct mating with male power connector 90 when type A unit 68 and type B unit 88 are brought into mating proximity. A coaxial connector 98 is disposed in mating end 94 positioned for direct mating with mating end 92 when type A unit 68 and type B unit 88 are brought into mating proximity. Thus, type A unit 68 and type B unit 88 are mated, power and signal connections are made automatically between type A unit 68 and type B unit 88, whereby, to increase a number of available electric power receptacles 76 and coaxial Tees 78, it is only required to mate an additional type B unit 88.

Returning full attention now to FIG. 7, a locking pin 100 extends from type B unit 88 in a position where it can be engaged by locking notch 86 on latch plate 82 when type A unit 68 and type B unit 88 are mated and latch plate 82 is rotated about pivot pin 84 into a locking position.

Type B unit 88 can be an intermediate unit with suitable connectors in an outboard end 102 to permit an additional type B unit 88 (not shown) to be connected thereto. For this purpose, a latch plate 104, with pivot pin 106 and locking notch 108, is provided adjacent outboard end 102.

A termination 38, having a characteristic impedance matching that of the coaxial cable within type A unit 68 and type B unit 88, is provided optionally as a separate external plug-in element. It will be recalled that, in my prior disclosure, termination 38 is installed permanently within its duct section. In the present invention, however, it is not certain which unit will serve as the last unit in the chain. By providing termination 38 as a separate unit, it may be plugged into coaxial connector 98 in type A unit 68 (FIG. 8) to create a single-unit system, into a corresponding coaxial connector in type B unit 88 to create a two-unit system, or into a coaxial connector at the end of one or more further, unillustrated, units daisy chained past the end of the two units shown in FIG. 7.

A type C unit is the same as a type B unit except that its outboard end is devoid of connectors for daisy chaining additional type B or type C units. In addition, since a type C unit must necessarily be the last unit in the chain (it may also be the first and last unit), it includes an internal termination 38 connected downstream of the last coaxial Tee 78, as in my referenced patent. Since a side view of a type C unit appears exactly the same as type B unit 88, except for the omission of latch plate 104, and the omission of mating connectors from the outboard end, a type C unit is not explicitly shown in the figures.

It is within the contemplation of the present invention that direct physical mating between adjacent units is not necessarily required. For example, type A unit 68 and type B unit 88 may be installed separated by a substantial distance. Suitable power and radio frequency signal cables may be used to connect them together. In order to maintain the reflection- cancelling properties of my referenced patent, such radio frequency signal cables should have an electrical length equal to an integral multiple of one-half wavelength at the average radio frequency of interest. Such a half-wavelength cable provides a round-trip electrical length for reflected signals equal to an integral multiple of a full wavelength. Such a full-wavelength path is essentially invisible to radio frequency signals. Accordingly, the effect of whatever electrical lengths of cables provided within type A unit 68 and type B unit 88 are maintained when these units are interconnected by a cable having an electrical length equal to an integral multiple of a half wavelength.

Figure 9:
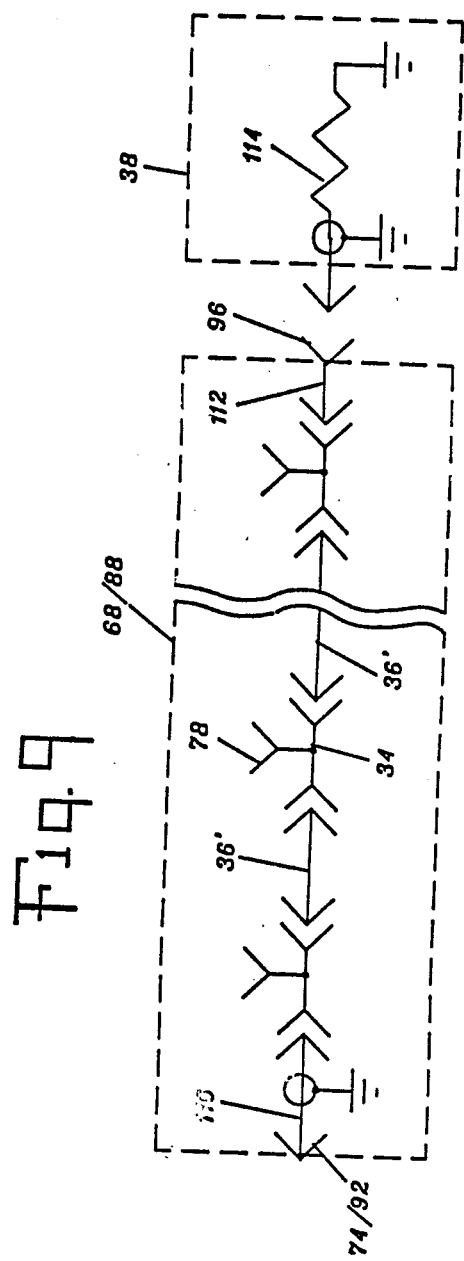
FIG. 9 is a schematic diagram of a type A or type B unit with a termination connectable external to the unit.

Referring now to FIG. 9, only the radio frequency signal distribution system in type A unit 68 or type B unit 88 is shown. Quarter-wavelength coaxial cables 36' interconnect adjacent coaxial Tees 34. However, an input coaxial cable 110 and an output coaxial cable 112 each have an electrical length equal to one- eighth of the average radio-frequency wavelength.

Termination 38 includes a terminating resistor 114 therein. Terminating resistor 114 has a resistance substantially equal to the characteristic impedance of coaxial cables 36,, input coaxial cable 110 and output coaxial cable 112 which, in the preferred embodiment, is about 75 ohms. When termination 38 is mated to female power receptacle 96, since it's impedance is wholly resistive, and substantially equal to the impedance of the coaxial cable to which it is mated, termination 38 produces no reflections.

Referring now to FIG. 10, a schematic diagram illustrates type A unit 68 mated to type B unit 88. It will be noted that input coaxial cable 110 and output coaxial cable 112 are connected together by female power receptacle 96 and coaxial connector 98. Thus, the total electrical length between the last coaxial Tee 34 in type A unit 68 and the first coaxial Tee 34 in type B unit 88 is the sum of two one-eighth wavelengths of coaxial cable. Accordingly, the total electrical length between the last and first coaxial Tees 34 is again one-quarter wavelength. Thus, the reflection-cancelling properties of my referenced patent is retained even when two or more units are daisy chained together.

The downstream end of type B unit 88, to the right in FIG. 10, may be connected to a further type B unit 88 or a type C unit (neither of which is shown), or may be terminated by a termination 38 connected externally (for a type B unit) or internally (for a type C unit).

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A modular power and signal distribution system comprising:

an A duct unit;

said A duct unit including means for connecting electric power and a radio frequency signal to a first end thereof;

at least one power receptacle in said A duct unit;

said at least one power receptacle being accessible for supplying said electric power to at least one external device;

at least one coaxial connector;

said at least one coaxial connector being accessible for supplying said radio frequency signal to at least one external device;

a female power connector rigidly affixed to a second end of said A duct unit;

at least a second coaxial connector rigidly affixed to said second end in a predetermined positional relationship with said female power connector;

a second duct unit;

said second duct unit including a male power connector rigidly affixed to a third end thereof;

said second duct unit further including a third coaxial connector rigidly affixed to said third end;

said male power connector and said third coaxial connector being positioned in complementary positional relationship with said female power connector and said at least a second coaxial connector;

said complementary positional relationship being effective, when said third end is brought into mating alignment with said second end, to permit mating engagement between said male power connector and said female power connector and between said at least a second coaxial connector and said third coaxial connector;

first internal means in said A duct unit for connecting said electric power to said at least one power receptacle and said female power connector, whereby connection thereto of electric power from said means for connecting electric power is enabled;

second internal means in said A duct unit for connecting said radio frequency signal from said means for connecting a radio frequency signal to said at least one coaxial connector and said at least a second coaxial connector, whereby connection thereto of said radio frequency signal is enabled; and means for retaining said mating engagement.

2. Apparatus according to claim 1, wherein said second duct unit includes;

at least a second power receptacle;

said at least a second power receptacle being accessible for connection of electric power to at least one external device;

at least a third coaxial connector; and said at least a third coaxial connector being accessible for connection of said radio frequency signal to at least one external device.

3. Apparatus according to claim 2, further comprising:

said second duct unit being a C duct unit;

a termination in said C duct unit downstream of a last of said at least a third coaxial connector for termination of said radio frequency signal.

4. Apparatus according to claim 2 wherein:

said second unit includes a B unit;

a second female power connector rigidly affixed to a fourth end of said B duct unit:

at least a fourth coaxial connector rigidly affixed to said fourth end in said predetermined positional relationship with said second female power connector; and means for retaining a mating engagement with a third duct unit, when installed.

5. Apparatus according to claim 4, further comprising;

a termination; and said termination including means for connection to said at least a fourth coaxial connector external to said B duct unit, whereby said radio frequency signal is terminated external to said B duct unit.

6. Apparatus according to claim 4, further comprising:

a termination; and said termination including means for selectively connection thereof to said at least a second coaxial connector and said at least a fourth coaxial connector, whereby said A duct unit may be used alone, or said A duct unit and said B duct unit may be used mated together.

7. Apparatus according to claim 1, further comprising;

a termination; and said termination including means for connection to said at least a second coaxial connector, whereby said A duct unit may be used without said second duct unit.

8. A radio frequency signal distribution system comprising:

first and second ducts;

means for connecting a radio frequency signal to said first duct;

at least a first coaxial Tee in said first duct;

means for connecting said radio frequency signal to said first coaxial Tee;

at least a first coaxial connector in said first duct;

a first coaxial cable from said at least a first coaxial Tee to said at least a first coaxial connector;

at least a second coaxial connector in said second duct;

at least a second coaxial Tee in said second duct;

a second coaxial cable from said second coaxial connector to said at least a second coaxial Tee;

means for mating said at least a first coaxial connector and said at least a second coaxial connector;

said first coaxial cable having an electrical length equal to an integral number of electrical wavelengths plus one-eighth of a wavelength at an average wavelength of said radio frequency signal; and said second coaxial cable having an electrical length equal to an integral number of electrical wavelengths plus one-eighth of a wavelength at an average wavelength of said radio frequency signal, whereby an electrical length from said at least a first coaxial Tee to said second coaxial Tee is equal to an integral number of said wavelengths plus one-quarter of said wavelength.

9. A radio frequency and power distrubution duct system comprising:

an A duct unit;

said A duct including means for connection to external sources of electric power and radio frequency signal;

a B duct unit;

said A duct unit and said B duct unit including means for mating therebetween;

said means for mating including a female power connector in said A duct unit and a male connector in said B duct unit;

said male power connector being positioned for mating with said female power connector whereby electric power is connected from said A duct unit to said B duct unit;

said means for mating including a first coaxial connector in said A duct unit;

said first coaxial connector having a predetermined fixed positional relationship with said female power receptacle;

said means for mating further including a second coaxial connector in said B duct unit; and said second coaxial connector having a complementary fixed positional relationship with said male power connector.

* * * * *